Oct. 30, 1951    R. H. HODGINS ET AL    2,573,335
AIRPLANE CRASH SWITCH

Filed March 26, 1948    4 Sheets-Sheet 3

Robert H. Hodgins
Clifford J. McGillivray
INVENTORS.

BY *Clarence A. O'Brien*
*and Harvey B. Jacobson*
Attorneys

Oct. 30, 1951   R. H. HODGINS ET AL   2,573,335
AIRPLANE CRASH SWITCH
Filed March 26, 1948   4 Sheets-Sheet 4
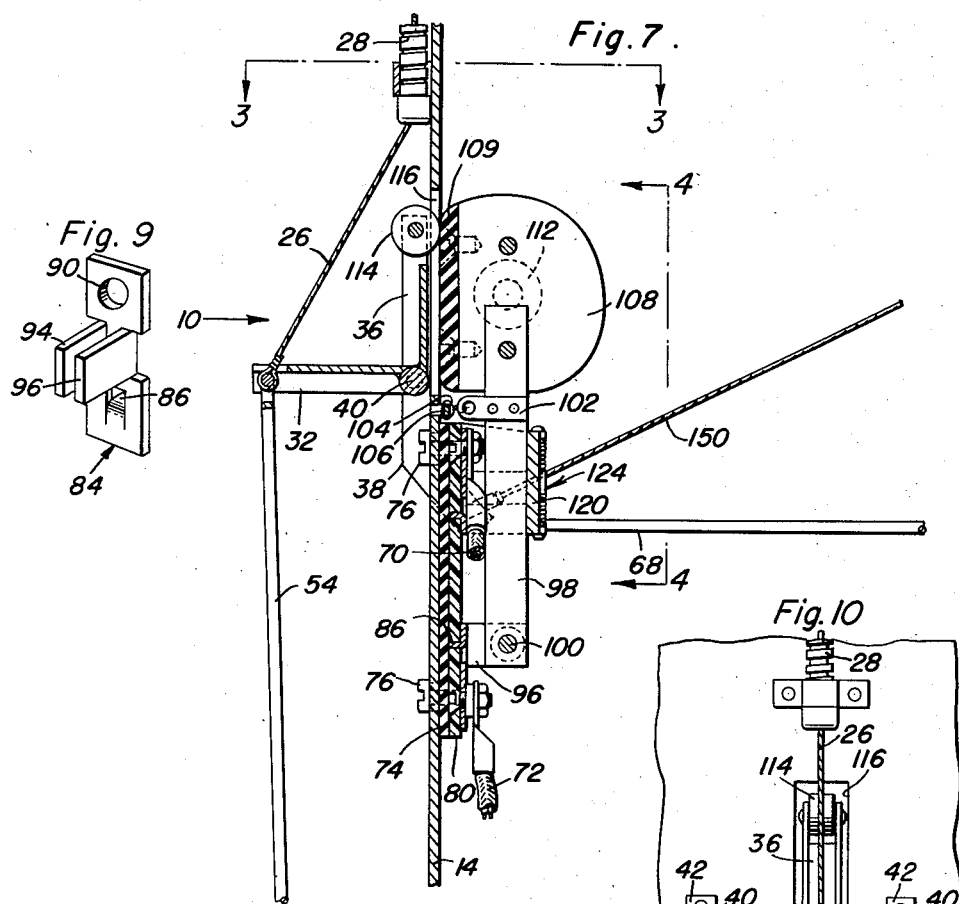
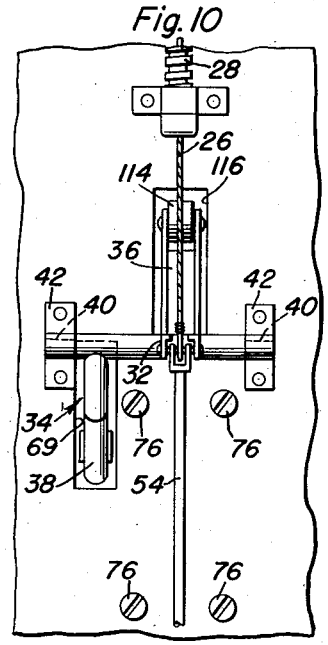
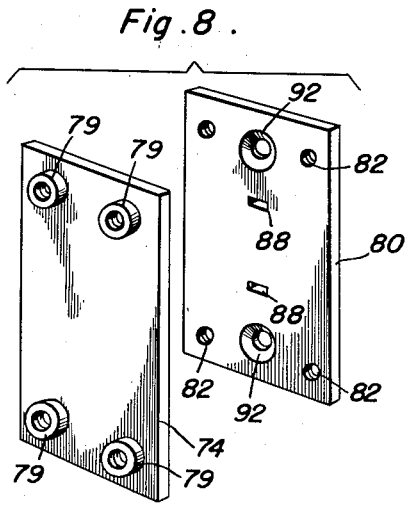
Robert H. Hodgins
Clifford J. McGillivray
INVENTORS.
BY *Clarence A. O'Brien*
*and Harvey B. Jacobson*
Attorneys Patented Oct. 30, 1951

2,573,335

UNITED STATES PATENT OFFICE 2,573,335

AIRPLANE CRASH SWITCH

Robert H. Hodgins, Vancouver, British Columbia, and Clifford J. McGillivray, New Westminster, British Columbia, Canada Application March 26, 1948, Serial No. 17,206

14 Claims. (Cl. 244—1)

This invention appertains to novel and useful improvements in attachments for aircraft.

An object of this invention is to break the circuit of the usual aircraft electrical system and simultaneously spray a fire extinguishing composition on various appurtenances contiguous to aircraft, upon the advent of a crash landing.

Another object of this invention is to provide means to close various elements in the aircraft while making the crash landing, such as to permit the closure of circuits, thereby preventing the flow of current from the generator, from the battery, and from the magnetos.

A still further object of this invention is to perform the above mentioned functions by several selective means, one of which is positioned forwardly of the fuselage of the aircraft, another of which is positioned at the lower surface of the aircraft fuselage, while another is positioned interior of the aircraft, whereby manual actuation thereof may be effected if found desirable.

A still further object of this invention is to provide improved means for carrying out the above described functions.

Another purpose of this invention is to simultaneously spray a compound on the engine, exhaust manifold and other heated portions of a conventional aircraft engine, and break a circuit formed by the conventional electrical system of an aircraft.

Another object of this invention is to supply a mass or weight on a pivoted arm of a switch, which mass actuates the pivoted arm upon abrupt deceleration of the aircraft, thereby rendering the switch inoperative for completing the circuit.

A still further object of this invention is to increase the safety in crash landing of aircraft by immediately opening the circuit of the electrical system of the aircraft, spraying fire extinguisher compound over the hot portions of the aircraft power plant, and, if desired, immediately stopping the supply of fuel to the aircraft engine.

Ancillary objects and features of novelty will become apparent to those skilled in the art, in following the description of the preferred form of the invention, illustrated in the accompanying drawings, wherein:

Figure 7 is a sectional view taken substantially on the line 7—7 of Figure 4 and in the direction of the arrows;

Figure 8 is a perspective view showing insulating elements utilized in association with the invention;

Figure 9 is a perspective view of a contact forming part of the switch, and

Figure 10 is a fragmentary elevational view taken in the direction of the arrow on the left side of Figure 7.

This invention has been developed to provide a device for the purpose of eliminating fire hazard at the time of crash by switching off the electrical system of a conventional aircraft, operating a master switch thereby rendering inoperative various electrical appurtenances, and spraying a fire extinguishing compound on the warm portions of the engine, as well as other portions which are likely to initiate a fire.

Figure 1:
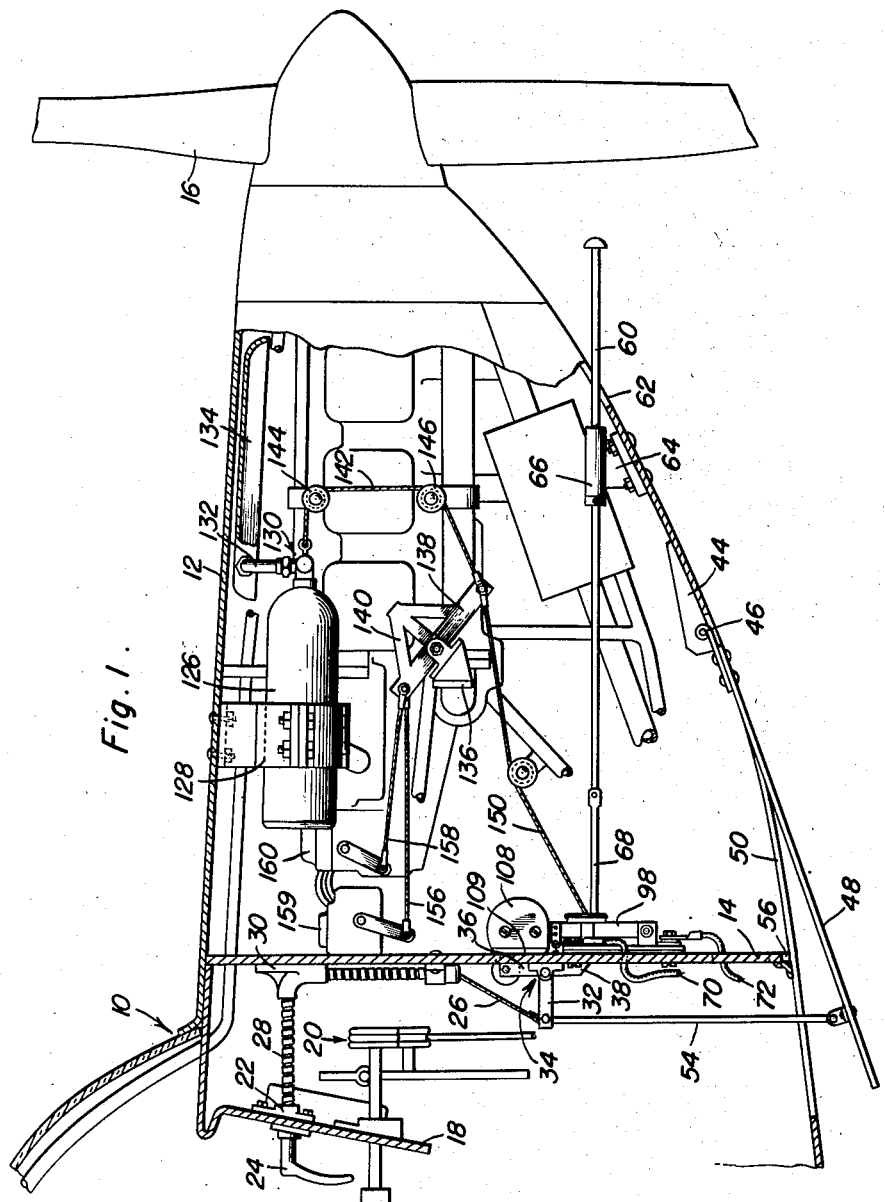
Figure 1 is a partial section of a longitudinal elevation of a typical aircraft fuselage showing various elements contiguous to the aircraft power plant and the invention affixed thereto.

Referring primarily to Figure 1, there is illustrated a conventional aircraft indicated at 10 having a fuselage 12 with a fire wall or partition 14 therein. Of course, the various appurtenances contiguous to aircraft prime movers or power plants for propeller operation are located within the fuselage.

An instrument panel 18 is illustrated within the cabin of the aircraft and the control surface actuation means generally indicated at 20 is associated therewith. A boss 22 is secured to the instrument panel 18 and has an actuation handle 24 extending therefrom. This actuation handle has a cable 26 rigidly attached thereto which extends through a sheath 28, attached to the interior surface (interior relative to the cabin of the aircraft) of the fire wall or partition by means of a conventional clamp 30.

Figure 2:
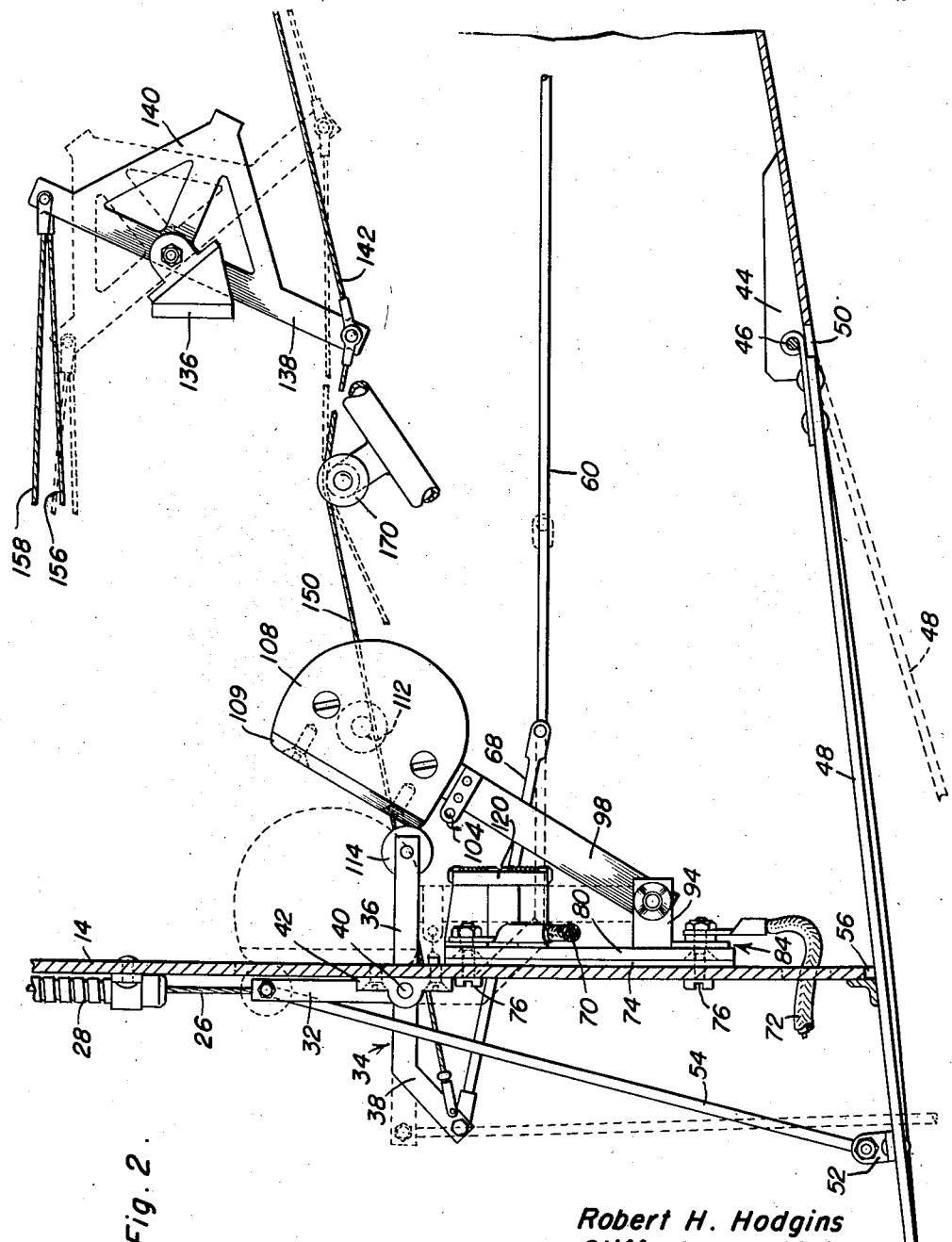
Figure 2 is an enlarged fragmentary sectional view illustrating portions of the invention which are shown in Figure 1.
Figure 3:
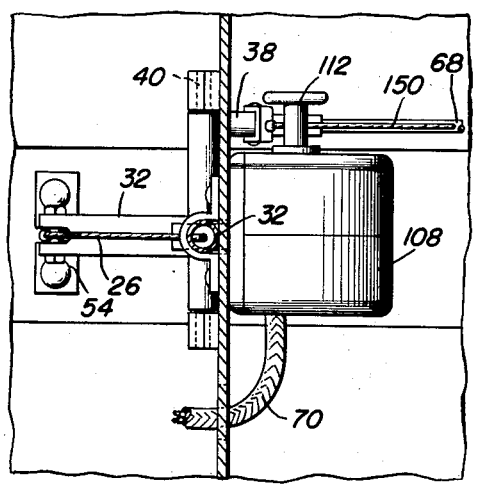
Figure 3 is a sectional view illustrating the switch forming a part of the present invention and taken substantially on the line 3—3 of Figure 7.
Figure 5:
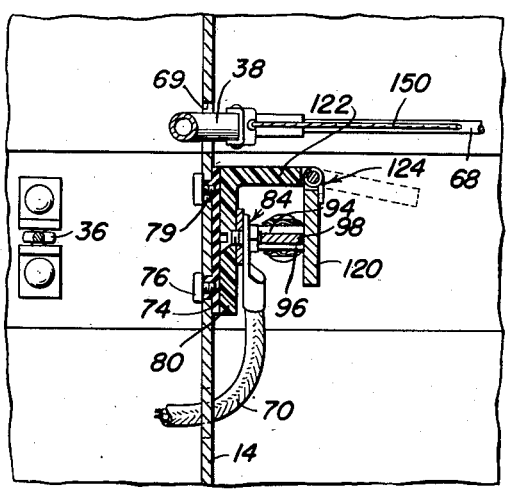
Figure 5 is a sectional view taken substantially on the line 5—5 of Figure 4 and in the direction of the arrows.

Referring to Figure 2, it will be seen that the cable 26 terminates at and is secured to a finger 32 which forms a portion of a crank generally indicated at 34. This crank has a plurality of fingers 32, 36 and 38 which initiate from a common center. Extending through the common center is a pivot pin 40 which is secured to the interior surface of the fire wall 14 by means of the brackets 42.

It may now be seen that upon actuation of the handle 24, the finger 32, and consequently the crank 34, is pivotally actuated.

The lower portion of the fuselage 12 is provided with a bracket 44 having a pivot pin 46 associated therewith. Secured to this pivot pin is a rod or arm 48 which is seated in a suitable recess 50 provided in the lower portion of the fuselage for accommodation thereof. Secured adjacent the opposite end of the arm 48 is a perch 52 having one end of a pitman 54 secured thereto. The opposite end of the pitman 54 is also connected with the finger 32 for actuation of the crank 34. The lowermost portion of the fire wall or partition 14 is provided with a notch 56 also for accommodating the rod 48.

An arm or rod 60 is slidably passed through an aperture 62 formed in the forward portion of the fuselage 12 and a guide 64 is secured to the inner surface of the fuselage therefor. This guide has a sleeve 66 formed integral therewith which accommodates a spring. The spring reacts on the rod 60 for constantly biasing the rod exteriorly of the fuselage. Upon forcing the rod 60 inwardly of the fuselage 12 against the opposing action of the spring (unshown) within the sleeve 66, the pitman 68 is urged (see Fig. 2) for actuation of the crank 34. The pitman 68 is conventionally connected in a manner peculiar to pitman rods to the rod 60 and also to the finger 38 of the crank 34 which passes through an aperture 69 in the fire wall 14.

In recapitulation, it is seen that three means independently actuatable are provided for rotating the crank 34 about its common center or pivot pin 40. One means is utilizable from the cockpit or cabin of the aircraft, another means is rendered operative upon belly landings, while the third means is rendered operative upon crash landings wherein the nose of the aircraft approaches the ground in a forced landing.

Figure 4:
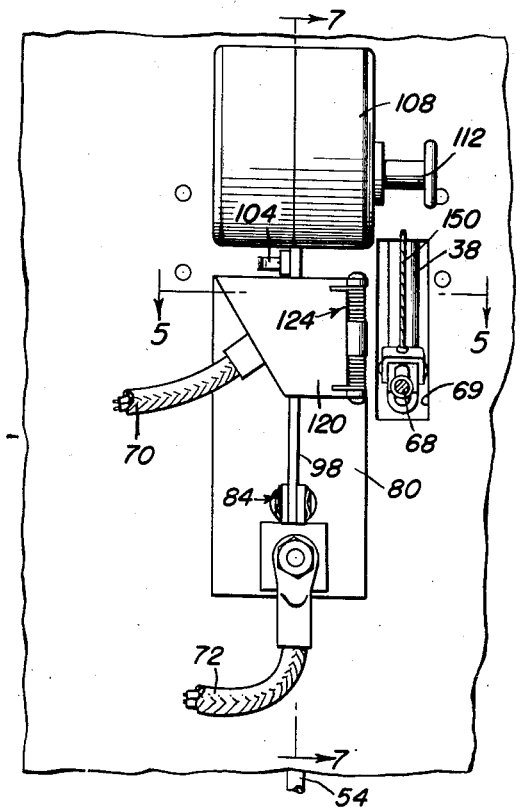
Figure 4 is another sectional view illustrating the switch and taken substantially on the line 4—4 of Figure 7.
Figure 6:
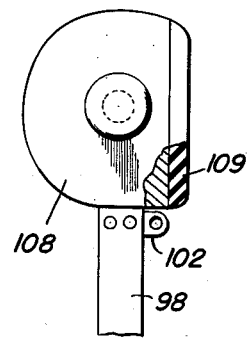
Figure 6 is an enlarged elevational view showing the weight or counterweight utilized in association with the switch.

Attention is now directed primarily to Figure 4 wherein there is disclosed a view of a master switch having conductors 70 and 72 terminating therein. These conductors are associated with the electrical system of the conventional aircraft in such a manner as to control the entire system. An insulation plate or sheet 74 is secured to the said fire wall or partition 14 by suitable means such as screws 76. Small sleeves 79 are secured to the insulating element 74 and extend through suitable apertures provided in the partition 14 for accommodation of the screws and also to insure insulation of the wires or conductors 70 and 72 from the body of the aircraft. A second insulating plate 80 is juxtaposed relative to the first-mentioned insulating plate 74 and is maintained in place by the extension of the screws 76 into the suitable apertures 82, which may be internally threaded for locking accommodation of the screws.

A pair of substantially identical brackets, generally indicated at 84, are secured to the insulating plate 80 by anchoring the tabs 86 in the slots 88 provided in the insulating plate 80 and also by reception of suitable screws through the apertures 90 which are ultimately seated in the countersunk apertures 92 formed in the insulating plate 80. It will be noted that the brackets, generally indicated at 84, are provided with spaced contacts 94 and 96, respectively, which cooperate with the pivoted arm 98. The pivoted arm 98 is pivotally associated with a pin 100 which extends through a pair of these spaced contacts 94 and 96 and is frictionally maintained in the pair of contact arms 94 and 96 of another one of the brackets.

The said conductors 72 and 70, respectively, are secured to respective brackets 84 and the circuit is made through the medium of the knife or pivoted arm 98.

An apertured strap 102 is secured to the pivoted arm 98 and a frangible or easily breakable connecting wire 104 is secured to the apertures in the said apertured strap 102. This frangible element is also secured to a suitable perch or bracket 106 formed in the said fire wall 14 for maintaining the said pivoted arm 98 in the circuit-closing position. Due to the vibration of the aircraft in flight and also due to air currents, this frangible element 104 is utilized for maintaining the pivoted arm 98 in the selected position, notwithstanding adverse conditions occurring in flying. Said strap 102 may be connected to the pivoted arm 98 with insulating material spacing these elements and also a suitable insulating material may be used in association with the bracket 106 for assurance of lack of transmission of current to the aircraft fuselage and body portions.

A weight or counterweight 108 is secured to the said pivoted arm 98 and is faced with a sheet of insulating material 109. This insulating material contacts the said fire wall 14 until urged therefrom either by a relatively large shock of the entire aircraft or by means to be described at this time.

An extension 112 extends laterally from the counterweight 108 and this extension is aligned with the cable 150, which in turn operates the rocker arm 138. When the switch is operated in response to aircraft impact without the aid of a push or pull control, the current is shut off from the battery, magnetos, and generator. A suitable opening or recess 116 is formed in the fire wall 14, whereby the roller 114 as well as the finger 36 passes therethrough to be contacted by the insulator 109. By breaking the frangible connecting element 106, the arm 98 is allowed to move pivotally as disclosed in Figure 7.

In order to prevent the return of the pivoted arm 98 to the circuit closing position, a closure 120 is connected with an extension 122 of the insulating sheet or plate 80. This closure is mounted by a conventional spring return hinge, 124, the arrangement being such to swing to the bracket 84 engaging position when the pivoted arm 98 swings to the circuit breaking position.

It may now be seen that upon actuation of the handle 24, or either of the rods 60 or 48, the pivoted arm 98 is urged to the circuit breaking position.

Simultaneously with the actuation of the switch described above, is the actuation of the device for spreading fire-extinguishing composition to various and sundry desired elements of the internal combustion engine or other aircraft prime mover system. Reference to Figure 2 discloses a tank 126 or other suitable receptacle which is attached to the interior of the fuselage 12 by means of a conventional bracket 128. A suitable and conventional valve 130 is connected with the outlet port of the tank 126 which may contain carbon dioxide, or compounds including carbon dioxide and inert materials. A conduit 132 is connected with the outlet of the valve 130 and a suitable baffle 134 is disposed over the sprayer conduit 132 for directing the fire extinguishing compound over the desired portions of the engine such as the hot exhaust manifold, relatively hot heads of the engine, and other elements.

A bracket 136 is secured within the fuselage 12 and has a rocker arm 138 pivoted thereto. This rocker arm has structural elements 140 thereon for additional strength and rigidity and the terminal portions of the rocker arms are utilized for the purpose of maintaining cables or other flexible force-transmitting means.

It may be seen that a cable 142 is secured to the valve 130, extending over a conventional pulley 144, thence over a second conventional pulley 146, whereupon it is secured to one end of the said rocker arm 138. A second cable 150 is also secured to the rocker arm immediately adjacent the said cable 142 and terminates in finger 38. It is now obvious that upon actuation of the crank 34 by the means described hereinabove, the valve 130 will be simultaneously actuated, thereby permitting the emission of fire extinguishing composition from the tank 126 over selected portions of the engine. In the course of transmission of movement from the crank 34 to the valve 130, however, the rocker 138 is motivated.

Cables 156 and 158, respectively, are secured to the opposite end of the said rocker arm 138 which are, in turn, simultaneously actuated with the actuation of the valve 130. Through this expedient, a conventional generator 159 may be rendered inoperative by the closing of a suitable switch, as also the flow of current from the magnetos by a suitable switch 160. It will be noted at this point that any apparatus or device which is inherently dangerous in a crash of an aircraft may be rendered inoperative by the utility of a cable connected to the rocker arm 138 similarly to the cables 156 and 158.

In the event that a relatively rough landing is made by the aircraft, the weight 108 is maintained in place by the friction of the contacts 94 and 96 and also by the frangible element 106. However, when a crash landing is effected, the jar is much greater and the counterweight is urged pivotally with the pivoted arm 98 by the means described hereinabove.

From the foregoing, a clear understanding of the operation of the invention is deemed apparent. However, it is understood that variations may be made such as the addition of elements as the pulley 170 for guiding the flexible cable 150 or other suitable equivalents may be made without departing from the spirit of the invention. Accordingly, limitation is sought only in accordance with the scope of the following claims.

Having described the invention, what is claimed as new is:

1. In an aircraft including a fuselage having a partition therein and an electrical system, a switch having a pivoted arm in the electrical system, electrically insulating means interposed between the switch and said partition, a weight attached to said pivoted arm, an insulating plate secured to said weight and engaging the partition, frangible means maintaining the insulating plate against the partition, means extending through said fuselage for breaking said frangible means and for actuation of the switch.

2. In an aircraft including a fuselage having a partition therein and an electrical system, a switch having a pivoted arm in the electrical system, electrically insulating means interposed between the switch and said partition, a weight attached to said pivoted arm, an insulating plate secured to said weight and engaging the partition, frangible means maintaining the insulating plate against the partition, means extending through said fuselage for breaking said frangible means and for actuation of the switch, said breaking means comprising a rod, a crank pivoted to said partition and connected to said rod, one end of said crank being in engagement with said insulating plate.

3. In an aircraft including a fuselage having a partition therein and an electrical system, a switch having a pivoted arm in the electrical system, electrically insulating means interposed between the switch and said partition, a weight attached to said pivoted arm, an insulating plate secured to said weight and engaging the partition, frangible means maintaining the insulating plate against the partition, means extending through said fuselage for breaking said frangible means and for actuation of the switch, said breaking means comprising a rod, a crank pivoted to said partition and connected to said rod, one end of said crank being in engagement with said insulating plate, a lever pivoted to said fuselage, and means for transmitting movement of said lever to said crank.

4. In an aircraft including a fuselage having a partition therein and an electrical system, a switch having a pivoted arm in the electrical system, electrically insulating means interposed between the switch and said partition, a weight attached to said pivoted arm, an insulating plate secured to said weight and engaging the partition, frangible means maintaining the insulating plate against the partition, means extending through said fuselage for breaking said frangible means and for actuation of the switch, said breaking means comprising a rod, a crank pivoted to said partition and connected to said rod, one end of said crank being in engagement with said insulating plate, a lever pivoted to said fuselage, means for transmitting movement of said lever to said crank, and manually operative means associated with said crank for actuation thereof.

5. In an aircraft including a fuselage having a partition therein and an electrical system, a switch having a pivoted arm in the electrical system, electrically insulating means interposed between the switch and said partition, a weight attached to said pivoted arm, an insulating plate secured to said weight and engaging the partition, frangible means maintaining the insulating plate against the partition, means extending through said fuselage for breaking said frangible means and for actuation of the switch, said breaking means comprising a rod, a crank pivoted to said partition and connected to said rod, one end of said crank being in engagement with said insulating plate, a tank secured within said fuselage for storing a fire extinguishing composition, a valve secured to said tank, means actuated by said crank and connected with said valve for actuation of said valve simultaneously with the actuation of said switch.

6. In an aircraft including a fuselage having a partition therein and an electrical system, a switch having a pivoted arm in the electrical system, electrically insulating means interposed between the switch and said partition, a weight attached to said pivoted arm, an insulating plate secured to said weight and engaging the partition, frangible means maintaining the insulating plate against the partition, means extending through said fuselage for breaking said frangible means and for actuation of the switch, said breaking means comprising a rod, a crank pivoted to said partition and connected to said rod, one end of said crank being in engagement with said insulating plate, a tank secured within said fuselage for storing a fire extinguishing composition, a valve secured to said tank, means actuated by said crank and connected with said valve for actuation of said valve simultaneously with the actuation of said switch, and a baffle secured in said fuselage for directing issuing compound in predetermined directions.

7. An aircraft including a fuselage having a partition therein and an electrical system, a bracket secured within said fuselage, a rocker arm pivoted to said bracket, a tank secured within said fuselage for storing fire extinguishing compound, an electrical switch including a pivoted arm and arranged to open the circuit of the electrical system, electrically insulating means for securing said switch to said partition, means mounted upon said partition for actuating said switch and said rocker arm, valve means secured to said tank, and flexible means connecting said rocker arm and said valve means.

8. An aircraft including a fuselage having a partition therein and an electrical system, a bracket secured within said fuselage, a rocker arm pivoted to said bracket, a tank secured within said fuselage for storing fire extinguishing compound, an electrical switch including a pivoted arm and arranged to open the circuit of the electrical system, electrically insulating means for securing said switch to said partition, means mounted upon said partition for actuating said switch and said rocker arm, valve means secured to said tank, flexible means connecting said rocker arm and said valve means, said actuation means including an arm pivoted to said fuselage and extending from the exterior portion thereof.

9. An aircraft including a fuselage having a partition therein and an electrical system, a bracket secured within said fuselage, a rocker arm pivoted to said bracket, a tank secured within said fuselage for storing fire extinguishing compound, an electrical switch including a pivoted arm and arranged to open the circuit of the electrical system, electrically insulating means for securing said switch to said partition, means mounted upon said partition for actuating said switch and said rocker arm, valve means secured to said tank, flexible means connecting said rocker arm and said valve means, said actuation means including an arm pivoted to said fuselage and extending from the exterior portion thereof, a weight secured to the switch pivoted arm, frangible means securing said weight to the partition, a crank having fingers pivoted to the partition, said arm being connected to one said finger, and another said finger engaging the weight.

10. An aircraft including a fuselage having a partition therein and an electrical system, a bracket secured within said fuselage, a rocker arm pivoted to said bracket, a tank secured within said fuselage for storing fire extinguishing compound, an electrical switch including a pivoted arm and arranged to open the circuit of the electrical system, electrically insulating means for securing said switch to said partition, means mounted upon said partition for actuating said switch and said rocker arm, valve means secured to said tank, flexible means connecting said rocker arm and said valve means, said actuation means including an arm pivoted to said fuselage and extending from the exterior portion thereof, a weight secured to the switch pivoted arm, frangible means securing said weight to the partition, a crank having fingers pivoted to the partition, said arm being connected to one of said fingers, and another said finger engaging the weight, a rod extending through said fuselage, and link means connecting still another said finger and said rod.

11. An aircraft including a fuselage having a partition therein and an electrical system with a generator, a bracket secured within said fuselage, a rocker rm pivoted to said bracket, a tank secured within said fuselage for storing fire extinguishing compound, an electrical switch including a pivoted arm and arranged to open the circuit of the electrical system, electrically insulating means for securing said switch to said partition, means mounted upon said fuselage for actuating said switch and said rocker arm, valve means secured to said tank, flexible means connecting said rocker arm and said valve means, and flexible means secured to said rocker arm and the generator for rendering the generator inoperative simultaneously with the actuation of the switch.

12. The combination of claim 10 and a baffle secured within said fuselage adjacent said valve means for directing issuing composition in predetermined paths.

13. The combination of claim 7 and means secured within said fuselage for guiding said flexible means.

14. The combination of claim 10 and manually operative means for actuating said crank.

ROBERT H. HODGINS.
CLIFFORD J. McGILLIVRAY.

REFERENCES CITED

The following references are of record in the file of this patent:

UNITED STATES PATENTS

| Number | Name | Date |
|---|---|---|
| 1,840,986 | Townsend | Jan. 12, 1932 |
| 2,100,416 | Torbert | Nov. 30, 1937 |
| 2,385,825 | Mathisen | Oct. 2, 1945 |

FOREIGN PATENTS

| Number | Country | Date |
|---|---|---|
| 238,356 | Great Britain | Aug. 20, 1925 |